US012626023B2

(12) United States Patent
Ramsdale et al.

(10) Patent No.: US 12,626,023 B2
(45) Date of Patent: May 12, 2026

(54) METHOD AND APPARATUS FOR DETECTING AN ATTACK ON OR DEGRADATION OF AN ELECTRONIC CIRCUIT

(71) Applicant: Agile Analog Ltd, Cambridge (GB)

(72) Inventors: Tim Ramsdale, Cambridge (GB); Katarzyna Muszynska, Cambridge (GB)

(73) Assignee: Agile Analog Ltd (GB)

( * ) Notice: Subject to any disclaimer, the term of this patent is extended or adjusted under 35 U.S.C. 154(b) by 0 days.

(21) Appl. No.: 18/691,856

(22) PCT Filed: Sep. 15, 2022

(86) PCT No.: PCT/GB2022/052332
§ 371 (c)(1),
(2) Date: Mar. 13, 2024

(87) PCT Pub. No.: WO2023/041911
PCT Pub. Date: Mar. 23, 2023

(65) Prior Publication Data
US 2024/0378322 A1     Nov. 14, 2024

(30) Foreign Application Priority Data

Sep. 17, 2021   (PL) ......................................... 438970
Sep. 24, 2021   (GB) ..................................... 2113642

(51) Int. Cl.
*G06F 21/75*          (2013.01)
*G06F 21/56*          (2013.01)

(52) U.S. Cl.
CPC .......... *G06F 21/755* (2017.08); *G06F 21/566* (2013.01)

(58) Field of Classification Search
CPC ........ G06F 21/755; G06F 21/566; G06F 1/28; G09C 1/00; H04L 9/003
See application file for complete search history.

(56) References Cited

U.S. PATENT DOCUMENTS 8,892,903 B1    11/2014  Trimberger
10,466,275 B1   11/2019  Vundavalli et al.
(Continued)

FOREIGN PATENT DOCUMENTS

EP          2982997 A1      2/2016
TW          201826065 A     7/2018

OTHER PUBLICATIONS

International Search Report for International Application No. PCT/GB2022/052332, dated Jul. 11, 2022, 8 pages.
(Continued)

*Primary Examiner* — Baotran N To
(74) *Attorney, Agent, or Firm* — Barnes & Thornburg LLP

(57)          ABSTRACT

An apparatus for detecting an attack on, or degradation of, an electric circuit is disclosed herein. The apparatus comprises a voltage level detector configured to determine whether the voltage level of the electric circuit exceeds a maximum selected threshold value, and to generate a first binary voltage limitation signal having if the voltage level exceeds the maximum selected threshold value. The apparatus also comprises a marginal voltage level detector configured to determine whether the voltage level of the electric circuit exceeds a marginal selected threshold value, the marginal selected threshold value being less than the maximum selected threshold value, and to generate a second binary voltage limitation signal having if the voltage level exceeds the marginal selected threshold value. A safety monitoring system monitors the first and second binary voltage limitation signals and is configured to determine that
(Continued)

a possible attack or degradation has taken place based on at least one of the first binary voltage limitation signal and the second binary voltage limitation signal.

17 Claims, 4 Drawing Sheets

(56) References Cited

U.S. PATENT DOCUMENTS

| | | | | |
|---|---|---|---|---|
| 2007/0182421 | A1* | 8/2007 | Janke ...................... | G06F 21/81 |
| | | | | 324/522 |
| 2010/0301873 | A1* | 12/2010 | Nobukata ............... | H04L 9/004 |
| | | | | 356/213 |
| 2015/0346246 | A1* | 12/2015 | Tasher ............. | G01R 19/16552 |
| | | | | 324/762.01 |
| 2020/0402602 | A1 | 12/2020 | Mahatme et al. | |

OTHER PUBLICATIONS

Taiwanese Office Action and Search Report for Application No. 111134885, dated Oct. 23, 2025, 0 pages.

\* cited by examiner

Fig. 4

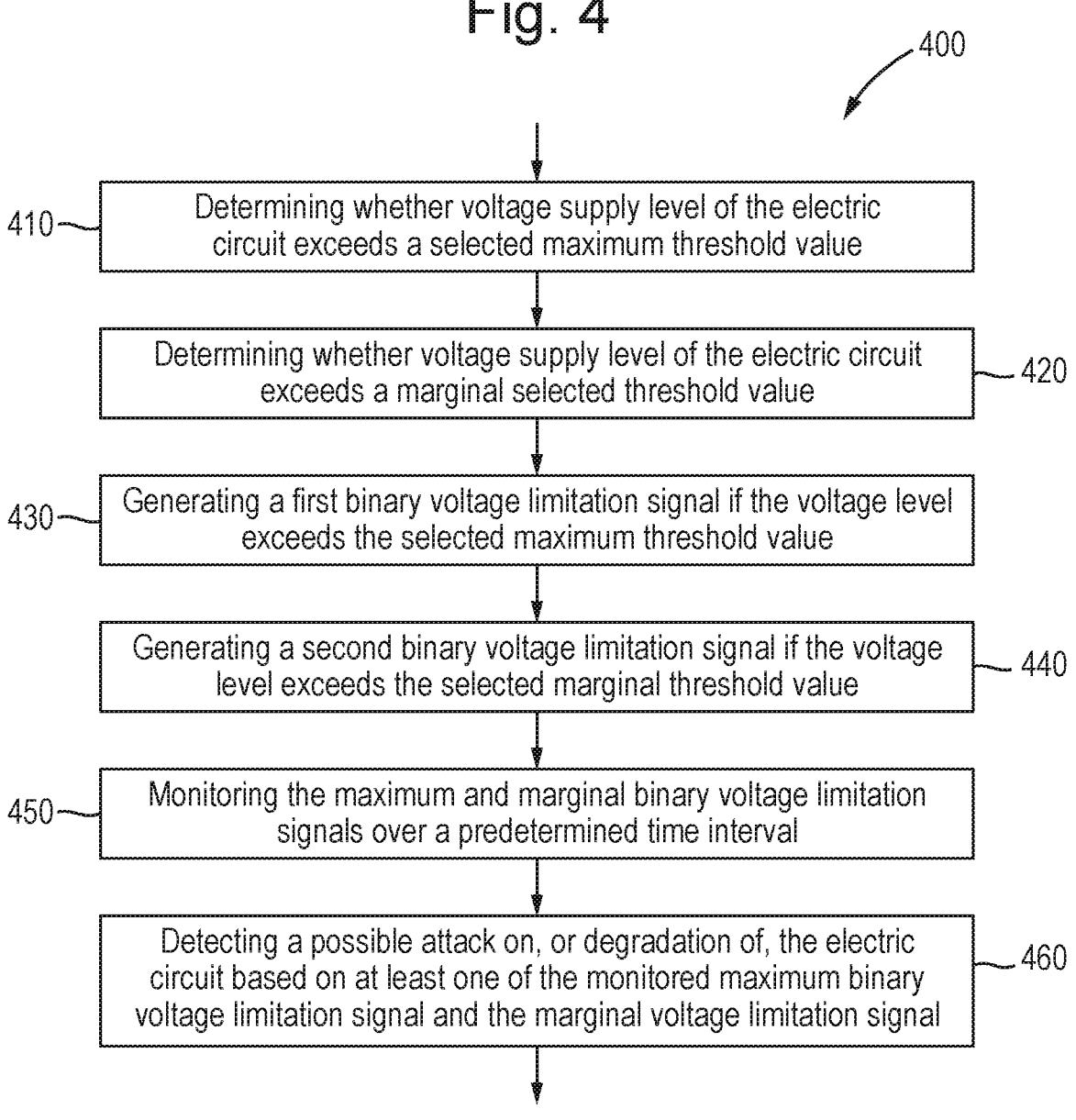

400

410 — Determining whether voltage supply level of the electric circuit exceeds a selected maximum threshold value Determining whether voltage supply level of the electric circuit exceeds a marginal selected threshold value — 420

430 — Generating a first binary voltage limitation signal if the voltage level exceeds the selected maximum threshold value Generating a second binary voltage limitation signal if the voltage level exceeds the selected marginal threshold value — 440

450 — Monitoring the maximum and marginal binary voltage limitation signals over a predetermined time interval Detecting a possible attack on, or degradation of, the electric circuit based on at least one of the monitored maximum binary voltage limitation signal and the marginal voltage limitation signal — 460

METHOD AND APPARATUS FOR DETECTING AN ATTACK ON OR DEGRADATION OF AN ELECTRONIC CIRCUIT

CROSS-REFERENCE TO RELATED APPLICATIONS

This application is a U.S. national stage entry of PCT Application No. PCT/GB2022/052332, filed Sep. 15, 2022, which claims priority to, and the benefit of, GB 2113642.9, filed 24 Sep. 24, 2021, and PL P.438970, filed 17 Sep. 2021, the disclosures of which are expressly incorporated herein by reference in their entireties.

FIELD OF THE INVENTION

The present disclosure relates to a method and apparatus for detecting an attack on or degradation of an electronic circuit, and in particular to a method and apparatus for detecting an attack on or degradation of an electronic circuit due to glitches in the supply voltage.

BACKGROUND

Modern electronic devices may be 'hacked' in order to gain access to a network, or to obtain secret information that can be used to further exploit the network. The process may involve an untrusted party manipulating the power supply pins of a chip to introduce 'voltage glitches' into a device. This can alter the ability of the circuit to function or can randomise the state of some of the logic. By doing this, the device can be made to falsely validate firmware as 'trusted' or enable a debug mode, which then enables access to secrets within the device.

An approach to counter this, for example as described in US2007182421, is to monitor the power supply for glitches. This may be done either using a digital or analog scheme. In the analog scheme, the supply is compared against a low and high threshold which represent the operating regime of the chip, and if the signal goes outside of these limits, the device is reset. U.S. Pat. No. 8,892,903 also describes a similar approach and discusses a circuit for detecting power analysis attacks that includes at least one load circuit, a power supply line, and a switch coupled to the load circuit and to the power supply line. The switch is configured to enable and disable the at least one load circuit, and a voltage monitor is configured to sample voltage levels of the supply voltage.

However, attacks are usually an iterative approach, seeking a specific failure sequence, and often exploit the marginality at the edge of the operating regime. As such-a number of glitches can be not detected, as they didn't quite exceed the operating regime of the chip but are still 'unusual' events.

In safety-critical systems in particular, but all systems in general, aging of components can present a challenge to the operators, as aging of digital circuits tends to make them slower, plus aging of power supply circuits tends to make them poorer at regulating the supply, and thus more voltage droop on load step events.

A solution to this may involve the monitoring of long-term average power supply values, but this averaging only answers whether there has been long-term drift in the nominal value of the supply. It doesn't give any indication of the minimum and maximum level of the supply, which is actually the values that affects the operation of the circuit (a similar analogy being a treadmill with poor speed controlmeasuring the average value at 10 kph is interesting but doesn't give any confidence in the machine. The fact that the instantaneous value could still range between 5 kph and 30 kph, whilst maintaining a 10 kph average, is of far more use).

Embodiments of the disclosure may seek to address such problems.

SUMMARY OF THE INVENTION

Aspects of the invention are as set out in the independent claims and optional features are set out in the dependent claims. Aspects of the invention may be provided in conjunction with each other and features of one aspect may be applied to other aspects.

In a first aspect there is provided an apparatus for detecting an attack on, or degradation of, an electric circuit is disclosed herein. The apparatus comprises a voltage level detector configured to determine whether the voltage level of the electric circuit exceeds a maximum selected threshold value, and to generate a first binary voltage limitation signal having if the voltage level exceeds the maximum selected threshold value. The apparatus also comprises a marginal voltage level detector configured to determine whether the voltage level of the electric circuit exceeds a marginal selected threshold value, the marginal selected threshold value being less than the maximum selected threshold value, and to generate a second binary voltage limitation signal having if the voltage level exceeds the marginal selected threshold value. A safety monitoring system monitors the first and second binary voltage limitation signals and is configured to determine that a possible attack or degradation has taken place based on at least one of the first binary voltage limitation signal and the second binary voltage limitation signal.

The safety monitoring system may be configured to monitor the first and second binary voltage limitation signals over a predetermined time interval.

It will be understood that there may be three binary signals-a first signal indicating that the voltage is outside range or not, a second indicating whether the voltage range is too high or not, and a third indicating whether the voltage is too low or not. The safety warning system may be configured to monitor all three binary voltage limitation signals and determine that a possible attack or degradation has taken placed based on all three binary voltage signals. The second and third binary voltage signals may be provided by the marginal voltage level detector.

Advantageously, the addition of the 'marginal detectors' which may be fast comparators, and some additional optional control logic allows the detection of marginal events, such as security attacks or load step events which could cause the circuit not to function. The additional optional control logic may comprise a counter and/or timer, and may be configured to operate over a wider voltage range than either the volage level detector and/or the marginal voltage level detector so that it isn't itself susceptible to glitches and/or may be configured to operate over an internally regulated supply, which isolates it from potential glitches.

The safety monitoring system may be configured to determine that a possible attack or degradation has taken place in the event that at least one of:

(i) the first binary voltage limitation signal indicates that the voltage level exceeds the maximum selected threshold value; and (ii) the second binary voltage limitation signal indicates that the voltage level has exceeded the marginal selected threshold value more than a selected number of times.

The safety monitoring system may be configured to determine that a possible attack has taken place in the event that the first binary voltage limitation signal indicates that the voltage level exceeds the maximum selected threshold value for more than a selected period of time.

The safety monitoring system may be configured to determine that a possible attack or degradation has taken place in the event that the marginal binary voltage limitation signal indicates that the voltage level exceeds the marginal selected threshold value more than a selected number of times in a selected period of time.

The maximum selected threshold value may comprise a maximum selected threshold range. Similarly, the marginal selected threshold value may comprise a marginal selected threshold range.

The maximum selected threshold value may comprise a lower maximum selected threshold value and a higher maximum selected threshold value. The voltage level detector may comprise a first comparator configured to determine whether the voltage level of the electric circuit exceeds the lower maximum selected threshold value, and a second comparator configured to determine whether the voltage level of the electric circuit exceeds the higher maximum selected threshold value. The first and/or second comparator may be a high-speed comparator. The first and second comparators may be adjustable to adjust the threshold values.

The marginal selected threshold value may comprise a lower marginal selected threshold value and a higher marginal selected threshold value. The marginal voltage level detector may comprise a first marginal comparator configured to determine whether the voltage level of the electric circuit exceeds the lower marginal selected threshold value, and a second marginal comparator configured to determine whether the voltage level of the electric circuit exceeds the higher marginal selected threshold value. The first and/or second marginal comparator may be a high-speed comparator. The first and second marginal comparators may be adjustable to adjust the threshold values.

For example, the marginal voltage level detectors may be set to thresholds which are within the voltage level detection range (i.e. conventional glitch detector parameters). So, for example, if the nominal voltage is 1.2V, and the thresholds are normally set as (min) 1.08V and (max) 1.32V, then the marginal voltage level detectors could be set to 1.13V and 1.27V. Depending on the application, these thresholds can be fixed, or they can be varied in order to build up a histogram of behaviour over time.

The safety monitoring system may comprise counting logic configured count the first and second binary voltage limitation signals. The counting logic may be configured to determine the time between receipt of the first and/or second binary voltage limitation signals. The safety monitoring system may be configured to determine that a possible attack or degradation has taken place in the event that the counting logic determines that the voltage level exceeds the marginal selected threshold value a plurality of times within a selected time interval. In advanced applications, the duration between events could also be measured, to identify systemic attacks or regular aging effects.

The safety monitoring system may be configured to take action in the event that it determines that a possible attack or degradation has taken place, for example as discussed below with reference to the example potential use cases. For example, the safety warning system may be configured to output a signal to indicate to a controller or remote device that the circuit may have been comprised (either due to an attack or degradation) so that mitigating action may be taken.

In some examples, each of the voltage level detector and the marginal voltage detector are configured to compare a level of the voltage supply to a level of a reference signal and are configured to generate the first and/or second binary voltage limitation signal based on the comparison. The reference signal may be a temperature compensated reference voltage. For example, the reference signal may be provided by a bandgap.

In some examples a plurality of the apparatus described above may be used to measure different parts of the same power supply, for example to detect variable voltage degradation. Additionally, or alternatively, a device comprising a plurality of power supplies may comprise a respective apparatus for each respective power supply, for example to detect attacks on specific supplies.

In another aspect there is provided a method of detecting an attack on, or degradation of, an electric circuit, the method comprising: determining whether voltage consumption of the electric circuit exceeds a selected maximum threshold value; determining whether the voltage supply level of the electric circuit exceeds a marginal selected threshold value; generating a first binary voltage limitation signal if the voltage supply level exceeds the selected maximum threshold value; generating a second binary voltage limitation signal if the voltage supply level exceeds the selected marginal threshold value; monitoring the maximum and marginal binary voltage limitation signals over a predetermined time interval; and detecting a possible attack on, or degradation of, the electric circuit based on at least one of the monitored maximum binary voltage limitation signal and the marginal voltage limitation signal.

The method may further comprise detecting or determining a possible attack on, or degradation of, the electric circuit in the event that at least one of: (i) the first binary voltage limitation signal indicates that the voltage supply level exceeds the maximum selected threshold value; and (ii) the second binary voltage limitation signal indicates that the voltage supply level has exceeded the marginal selected threshold value more than a selected number of times.

In some examples the method may further comprise performing mitigating action in response to determining or detecting that a possible attack on, or degradation of, the electric circuit has occurred. For example, the mitigating action may comprise sending a signal via a digital output, for example to perform a mitigating action.

The method may comprise determining that a possible attack has taken place in the event that the first binary voltage limitation signal indicates that the voltage supply level exceeds the maximum selected threshold value for more than a selected period of time The method may comprise determining that a possible attack or degradation has taken place in the event that the marginal binary voltage limitation signal indicates that the voltage supply level exceeds the marginal selected threshold value more than a selected number of times in a selected period of time.

The maximum selected threshold value may comprise a maximum selected threshold range. The marginal selected threshold value may comprise a marginal selected threshold range. The maximum selected threshold value may comprise a lower maximum selected threshold value and a higher maximum selected threshold value. The marginal selected threshold value may comprise a lower marginal selected threshold value and a higher marginal selected threshold value.

The method may further comprise determining with a fist comparator whether the voltage supply level of the electric circuit exceeds the lower maximum selected threshold value and determining with a second comparator whether the voltage supply level of the electric circuit exceeds the higher maximum selected threshold value.

The method may further comprise determining with a first marginal comparator whether the voltage supply level of the electric circuit exceeds the lower marginal selected threshold value and determining with a second marginal comparator whether the voltage supply level of the electric circuit exceeds the higher marginal selected threshold value.

The method may further comprise counting the first and second binary voltage limitation signals with counting logic. The method may further comprise determining, with the counting logic, the time between receipt of the first and/or second binary voltage limitation signals. The method may further comprise determining that a possible attack or degradation has taken place in the event that the counting logic determines that the voltage supply level exceeds the marginal selected threshold value a plurality of times within a selected time interval In some examples determining whether the voltage supply level of the electric circuit exceeds a selected maximum threshold value and/or a marginal selected threshold level comprises comparing a level of the voltage supply to a level of a reference signal and generating the first and/or second binary voltage limitation signal based on the comparison.

In another aspect there is provided a computer readable non-transitory storage medium comprising a program for a computer configured to cause a processor to perform the method of detecting an attack on, or degradation of, an electric circuit of the aspect described above.

DRAWINGS

Embodiments of the disclosure will now be described, by way of example only, with reference to the accompanying drawings, in which:

FIG. 4 shows an illustrative process flow chart for a method of detecting an attack on, or degradation of, an electric circuit.

SPECIFIC DESCRIPTION

Embodiments of the disclosure relate to a method and apparatus ("voltage glitch monitor") for detecting an attack on or degradation of an electronic circuit that can provide security and protection against voltage sidechannel attacks (SCA) and tampering such as supply voltage changes/glitches and power supply manipulation. The voltage glitch monitor can provide digital outputs to warn (secure) processors of intrusion attempts, thus enabling a holistic approach to hardware security. Furthermore, the voltage glitch monitor can also monitor for attempted or repeated attacks and/or degradation of an electric circuit over time by monitoring smaller, subtle changes in voltage level.

The voltage glitch monitor can be tuned by a user and would be ideally suited for security and monitoring in applications such as in IoT, Security, Automotive, Medical, AI and general SoCs and ASICs.

Figure 1:
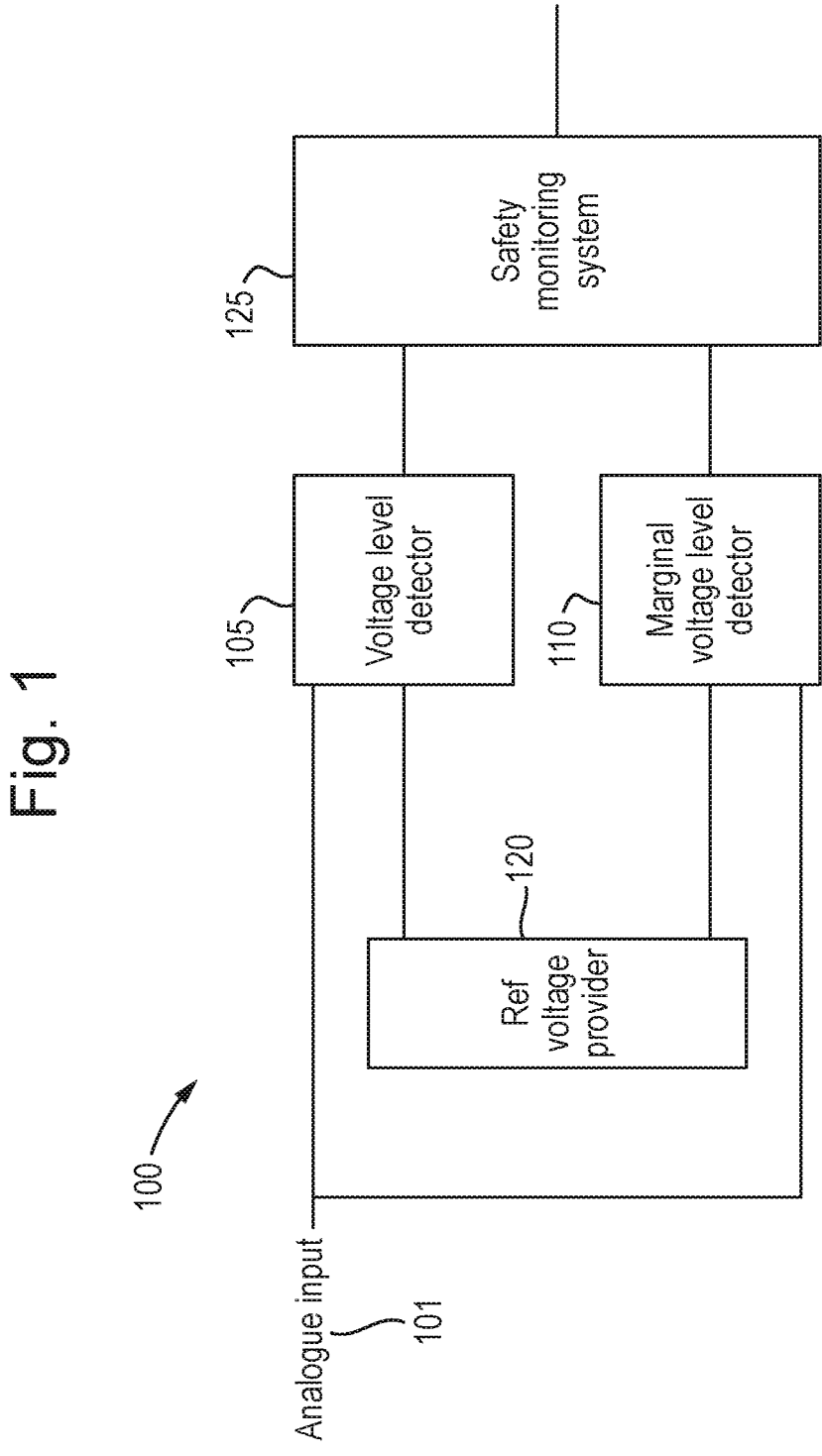
FIG. 1 shows a schematic diagram of an example apparatus for detecting an attack on, or degradation of, an electric circuit.

An example voltage glitch monitor 100 is shown in FIG. 1. The voltage glitch monitor 100 in FIG. 1 is an apparatus for detecting an attack on, or degradation of, an electric circuit. The voltage glitch monitor 100 comprises an analog input 101 from the electric circuit. The analog input 101 is coupled in parallel to a voltage level detector 105 and a marginal voltage level detector 110. A reference voltage provider 120 is also coupled in parallel to the voltage level detector 105 and the marginal voltage consumption detector 110. A safety monitoring system 125 is coupled in parallel to the voltage level detector 105 and the marginal voltage level detector 110.

The voltage level detector 105 is configured to determine whether voltage consumption of the electric circuit exceeds a maximum selected threshold value, and to generate a first binary voltage limitation signal having if the voltage consumption exceeds the maximum selected threshold value.

The marginal voltage level detector 110 is configured to determine whether the voltage consumption of the electric circuit exceeds a marginal selected threshold value, the marginal selected threshold value being less than the maximum selected threshold value, and to generate a second binary voltage limitation signal having if the voltage consumption exceeds the marginal selected threshold value.

In the example shown each of the voltage level detector 105 and the marginal voltage level detector 110 are configured to compare the voltage level of the analog input 101 to a level of a reference signal generated by the reference voltage provider 120 and are configured to generate the first and/or second binary voltage limitation signal based on the comparison.

The safety monitoring system 125 is for monitoring the first and second binary voltage limitation signals and is configured to determine that a possible attack or degradation has taken place based on at least one of the first binary voltage limitation signal and the second binary voltage limitation signal.

The safety monitoring system 125 may be configured to determine that a possible attack or degradation has taken place in the event that at least one of (i) the first binary voltage limitation signal indicates that the voltage level exceeds the maximum selected threshold value, and (ii) the second binary voltage limitation signal indicates that the voltage level has exceeded the marginal selected threshold value more than a selected number of times.

Advantageously the use of the marginal voltage level detector 110 allows the detection of marginal events, such as security attacks or load step events which could cause the circuit not to function.

Figure 2:
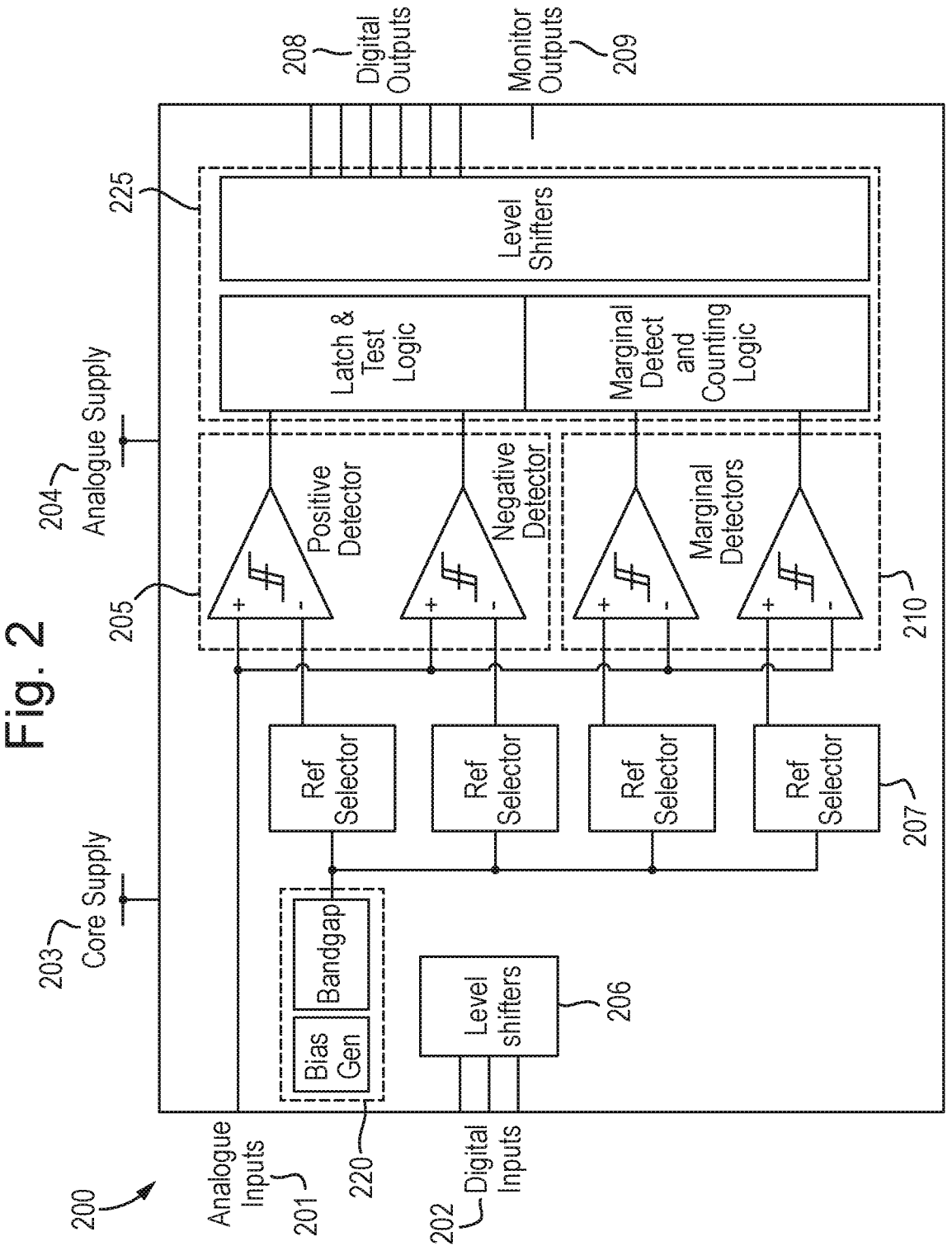
FIG. 2 shows a circuit diagram of an example apparatus for detecting an attack, such as the example of FIG. 1.

A circuit diagram of an example apparatus for detecting an attack, such as the example of FIG. 1, is shown in FIG. 2. The apparatus of FIG. 2 shares many features in common with the apparatus of FIG. 1, with like reference numerals indicating features with the same or similar functionality.

FIG. 2 shows a voltage glitch monitor 200 comprises an analog input 201 from the electric circuit. The analog input 201 is coupled in parallel to a voltage level detector 205 and a marginal voltage level detector 210. A core supply 203 and an analog 204 supply are provided, along with digital inputs 202 coupled to level shifters 206. The In the example shown the voltage level detector 205 and the marginal voltage level detector 210 each comprise a pair of high-speed comparators. Two configurations of a comparator are specified, to enable over-voltage and under-voltage glitches to be detected. The thresholds are configurable, and level-shifters are incorporated to allow the IOs to be driven from the core supply 203. Providing a pair of high-speed comparators means that a voltage minimum and a voltage maximum can be measured; in other words the voltage level detector 210 is operable to determine whether a voltage of the analog input is outside of a selected voltage range. The voltage level detector 205 and specifically its pair of high-speed comparators are configured to determine whether voltage consumption of the electric circuit exceeds a maximum selected threshold range (i.e. minimum and maximum values), and to generate a first binary voltage limitation signal having if the voltage consumption exceeds the maximum selected threshold range. Similarly, the marginal voltage level detector 210 and specifically its pair of high-speed comparators are configured to determine whether the voltage level of the electric circuit exceeds a marginal selected threshold range (i.e. minimum and maximum values), the marginal selected threshold range being less than and falling within the maximum selected threshold range, and to generate a second binary voltage limitation signal having if the voltage consumption exceeds the marginal selected threshold range.

A reference voltage provider 220 is also coupled in parallel to the voltage level detector 205 and the marginal voltage level detector 210. In the example shown the reference voltage provider 220 comprises a bias generator and a bandgap. The bandgap provides an accurate voltage reference for the other system components and is designed to operate from a wider voltage range than typical to ensure good coverage of glitch monitoring. The bandgap follows a traditional architecture, based on ratios of current through two different p-n junctions. The bandgap incorporates a bootstrap circuit to ensure reliable turn-on at start up and has the option for production trim to increase accuracy. Each of the voltage level detector 205 and the marginal voltage level detector 210 are configured to compare the voltage level of the analog input 201 to a level of a reference signal generated by the reference voltage provider 220 and are configured to generate the first and/or second binary voltage limitation signal based on the comparison.

A safety monitoring system 225 is coupled in parallel to the voltage level detector 205 and the marginal voltage level detector 210. The safety monitoring system 225 comprises latch and test logic coupled to the comparators of the voltage level detector 205 and marginal detect and counting logic coupled to the marginal voltage level detector 210. The marginal detect and counting logic may include counters and timers, for example counting and timing logic. The marginal detect and counting logic may be configured to operate over a wider voltage range than either the volage level detector and/or the marginal voltage level detector so that it isn't itself susceptible to glitches and/or may be configured to operate over an internally regulated supply, which isolates it from potential glitches. However, it will be understood that in some examples the latch and test logic may be the same as the marginal detect and counting logic, but in other examples that the logic differs. Both the latch and test logic and the marginal detect and counting logic are coupled to level shifters. The safety monitoring system 225 is coupled to digital outputs 208, for example for use in executing a mitigating action in the event that a possible attack or degradation is determined (for example for reporting a potential attack or degradation to a remote server so that remedial action may be taken). Mitigating action may include resetting the device (for example, resetting the security statis and requiring reauthentication of keys). Mitigating action may additionally or alternatively include reporting the issue to a central server. For example, if the device is a door lock, it could flag an issue for monitoring via camera or a security guard. Mitigating action may additionally or alternatively include deleting all its secret information for example if the device is a crypto wallet or a bank card. If it were due to performance degradation mitigating action may additionally or alternatively include, operating in a different mode of operation. For example, if the device is a self-driving car, then it could go into a 'non automatic' driving mode, or in a limp-home mode. The control logic provides the following functions:

Control of enables based on digital inputs

Latching of momentary events on the comparator outputs.

Disabling the outputs during test mode 3-way majority voting on latched outputs

The safety monitoring system 225 is for monitoring the first and second binary voltage limitation signals and is configured to determine that a possible attack or degradation has taken place based on at least one of the first binary voltage limitation signal and the second binary voltage limitation signal. As with the example of FIG. 1, the safety monitoring system 225 may be configured to determine that a possible attack or degradation has taken place in the event that at least one of (i) the first binary voltage limitation signal indicates that the voltage level exceeds the maximum selected threshold value, and (ii) the second binary voltage limitation signal indicates that the voltage level has exceeded the marginal selected threshold value more than a selected number of times.

Also shown in the example of FIG. 2 but not in the example of FIG. 1 is the use of reference selectors 207. A respective reference selector 207 is coupled in series between the reference voltage provider 220 and an input of each comparator of the voltage level detector 205 and the marginal voltage level detector 210. Each reference selector 207 is operable to provide configurable input voltages to the programmable comparators, to allow the glitch voltage level to be adjusted. These also allow the thresholds to be adjusted if, for example, the core uses DVFS (Dynamic Voltage and Frequency Scaling).

In some examples an optional SAR ADC can be used to measure the exact value of the supply, which can be used for ongoing monitoring of lifetime issues or performance degradation.

Figure 3:
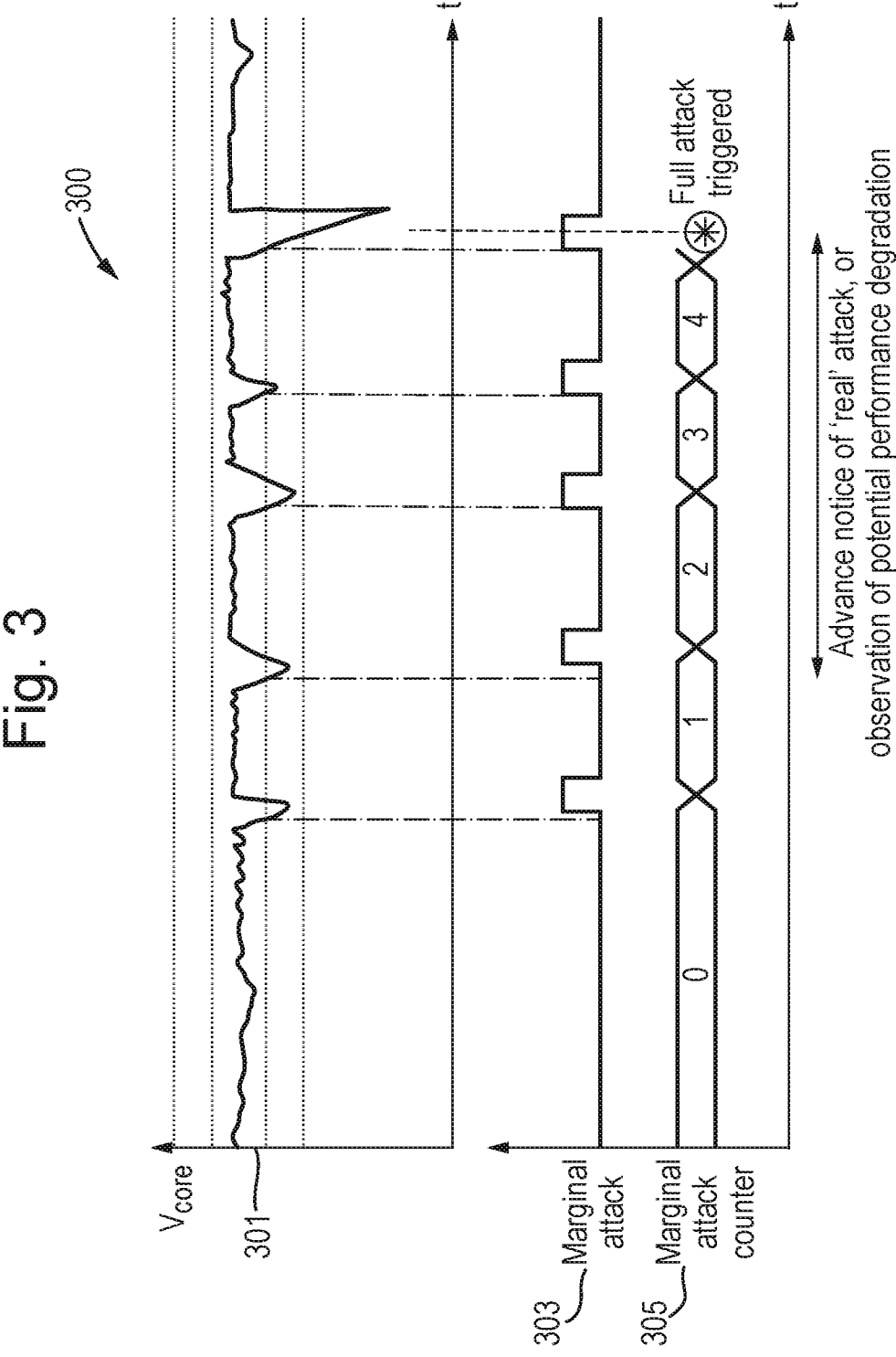
FIG. 3 shows a plot of marginal voltage attack events as a function of time.

FIG. 3 shows a plot 300 of marginal voltage attack events as a function of time. The plot 300 shows the measured voltage 301 compared to a reference voltage $V_{core}$. The plot also shows a binary marginal attack signal 303 and a marginal attack counter. It can be seen that as a function of time four smaller negative voltage peaks occur before a final larger fifth negative voltage peak. A conventional voltage glitch detector may only be capable of determining that an attack is taking place based on the larger fifth negative voltage peak. However, through the use of the marginal attack counter smaller voltage peaks can be detected and if a selected number of these happen (that exceed a marginal upper and lower threshold level) within a selected threshold time interval, then it may be determined that potential attack is about to occur or that there is a potential performance degradation. It will be understood that the threshold time interval may be a rolling time interval, for example a rolling time window.

Although the plot 300 of FIG. 3 shows a negative-going spike, equally a positive-going spike could be detected. It will also be understood that although an attack or degradation may be determined if a selected number of marginal peaks occur within a selected time interval, in other examples an attack or degradation may be determined simply if a selected number of marginal peaks are detected that exceed a selected threshold number of marginal peaks. Additionally, or alternatively, the time interval between peaks may be determined, for example so that if two peaks occur in quick succession (i.e. within a selected time interval of each other) a possible attack or degradation may be determined.

FIG. 4 shows an illustrative process flow chart for an example method 400 of detecting an attack on, or degradation of, an electric circuit that may be performed, for example, using the apparatus of FIG. 1 or FIG. 2. The method 400 comprises the steps of determining 410 whether the voltage level of the electric circuit exceeds a selected maximum threshold value (for example with the voltage level detector 105, 205, and specifically the high-speed comparators), determining 420 whether the voltage level of the electric circuit exceeds a marginal selected threshold value (for example with the marginal voltage level detector 110, 210, and specifically the high-speed comparators), generating 430 a first binary voltage limitation signal if the voltage level exceeds the selected maximum threshold value (for example with the safety monitoring system 125, 225, and specifically the latch and test logic), generating 440 a second binary voltage limitation signal if the voltage level exceeds the selected marginal threshold value (for example with the safety monitoring system 125, 225, and specifically the marginal detect and counting logic) monitoring 450 the maximum and marginal binary voltage limitation signals over a predetermined time interval (for example with the safety monitoring system 125, 225, and specifically the latch and test logic/marginal detect and counting logic), and detecting 460 a possible attack on, or degradation of, the electric circuit based on at least one of the monitored maximum binary voltage limitation signal and the marginal voltage limitation signal.

To illustrate the potential uses and efficacy of the method and apparatus for detecting an attack on or degradation of an electronic circuit described above, some example potential use cases are described below, by way of example only.

Example 1

Device Driver assistance solution in modern car

Scenario Due to device lifetime effects a voltage supply regulator to a car's ADAS system means over time, an increased power supply resistance is seen. This effect is marginal, but is exacerbated at moments of high load, which can cause the voltage to drop below that acceptable for operation.

Result During highly complex, fast moving manoeuvres, the processing load draws too much power, and the system fails, handing control back to driver at key point.

Exploit The manufacturing fault is latent, and wasn't detected on the production line, as voltage was within spec. Due to lifetime effects, this degrades over time, and eventually fails during a point of high load.

Protection The voltage glitch monitor is able to detect ongoing voltage degradation ahead of time, and that at times this can spike from its optimum range. This is reported by the system back to the car manufacturer (e.g. via digital output 208), who can identify the fault, and call in cars in priority order to have this patched ahead of a fault causing an accident.

The automotive supplier may be able to remotely fix cars through a software patch to increase the supply voltage on faulty cars.

Example 2

Device Satellite TV receiver

Scenario Nefarious user plans to remove Digital Rights Management (DRM) from films broadcast over satellite channel and resell.

Result Content owner discovers that their content is available for rent download, without requisite payment back to them for number of views.

Exploit Nefarious user installs voltage glitcher on HDMI controller supply to Set Top Box satellite receiver with valid subscription. By voltage glitching, user is able to reset HDMI output to be non-HDCP validated, and decrypted HD content is streamed out to non-secure device. This device then re-encodes the content without protection.

Protection The voltage glitch monitor is able to detect voltage glitching on multiple supplies if desired. This means that glitch attacks on secondary supplies, and analog IP supplies, can also be protected against.

Example 3

Device Hotel electronic safe

Scenario Service personnel enters hotel room to clean, and is able to open the safe and extract contents without leaving any trace in the access log, and without changing the set code.

Result Malicious staff member is able to open hotel safe and remove valuables with no trace left.

Exploit Malicious staff member uses key-code entry device to test all combinations of key code. Before the lockout timer is triggered for each attempt, the supply is glitched to prevent the failed attempt or lockout being recorded.

Protection The voltage glitch monitor is able to detect the power supply being glitched and is able to flag to the secure microcontroller that semi-regular and suspicious power resets are occurring. This knowledge may then trigger, for example, a 4-hour lockout, protecting the contents from further attack.

Example 4

Device Industrial Equipment or Data Centre Server

Scenario Malicious entity gains access into power supply unit of a complex system (e.g. server, industrial equipment) though software attack and/or nontrusted hardware.

Result Remote control of power system allows a third-party to glitch or manipulate the supply, and either disturb workloads, or bypass trusted boot to gain full control of system Exploit The power delivery system is infiltrated by a nefarious party, and additional functionality is added which allows the power to be manipulated remotely. The system goes to production, and then a malicious entity is able to remotely manipulate the security by resetting/glitching through the power sequence.

Protection The voltage glitch monitor is able to detect the power supply being glitched/modified/manipulated and is able to signal to the CPU/wider system (e.g. via digital output 208) that nefarious activity is suspected. In separated systems, the device could depower itself, or revert to a safe mode until it is addressed by a maintenance team.

It will be appreciated from the discussion above that the embodiments shown in the Figures are merely exemplary, and include features which may be generalised, removed or replaced as described herein and as set out in the claims.

In the context of the present disclosure other examples and variations of the apparatus and methods described herein will be apparent to a person of skill in the art.

The invention claimed is:

1. An apparatus for detecting an attack on, or degradation of, an electric circuit, wherein the electric circuit comprises:
   a voltage level detector circuit configured to determine whether voltage level of the electric circuit exceeds a maximum selected threshold value, and to generate a first binary voltage limitation signal having if the voltage level exceeds the maximum selected threshold value;
   a marginal voltage level detector circuit configured to determine whether the voltage level of the electric circuit exceeds a marginal selected threshold value, the marginal selected threshold value being less than the maximum selected threshold value, and to generate a second binary voltage limitation signal having if the voltage level exceeds the marginal selected threshold value;
   a safety monitoring system circuit for monitoring the first and second binary voltage limitation signals configured to determine that a possible attack or degradation has taken place based on the first binary voltage limitation signal or the second binary voltage limitation signal, wherein the safety monitoring system circuit is configured to determine that a possible attack or degradation has taken place in the event that:
      (i) the first binary voltage limitation signal indicates that the voltage level exceeds the maximum selected threshold value; or
      (ii) the second binary voltage limitation signal indicates that the voltage level has exceeded the marginal selected threshold value more than a selected number of times in a selected period of time.

2. The apparatus of claim 1 wherein the safety monitoring system circuit is configured to determine that a possible attack has taken place in the event that the first binary voltage limitation signal indicates that the voltage level exceeds the maximum selected threshold value for more than a selected period of time.

3. The apparatus of claim 1 wherein the maximum selected threshold value comprises a maximum selected threshold range and/or wherein the marginal selected threshold value comprises a marginal selected threshold range.

4. The apparatus of claim 1 wherein the maximum selected threshold value comprises a lower maximum selected threshold value and a higher maximum selected threshold value, wherein the voltage level detector circuit comprises a first comparator configured to determine whether the voltage level of the electric circuit exceeds the lower maximum selected threshold value, and a second comparator configured to determine whether the voltage level of the electric circuit exceeds the higher maximum selected threshold value, and wherein the first and second comparators are adjustable to adjust the threshold values.

5. The apparatus of claim 1 wherein the marginal selected threshold value comprises a lower marginal selected threshold value and a higher marginal selected threshold value, wherein the marginal voltage level detector circuit comprises a first marginal comparator configured to determine whether voltage level of the electric circuit exceeds the lower marginal selected threshold value, and a second marginal comparator configured to determine whether the voltage level of the electric circuit exceeds the higher marginal selected threshold value, and wherein the first and second comparators are adjustable to adjust the threshold values.

6. The apparatus of claim 1 wherein the safety monitoring system circuit comprises counting logic configured count the first and second binary voltage limitation signals, wherein the counting logic is configured to determine the time between receipt of the first and/or second binary voltage limitation signals, and wherein the safety monitoring system circuit is configured to determine that a possible attack or degradation has taken place in the event that the counting logic determines that the voltage level exceeds the marginal selected threshold value a plurality of times within a selected time interval.

7. The apparatus of claim 1 wherein the safety monitoring system circuit is configured to take action in the event that it determines that a possible attack or degradation has taken place.

8. The apparatus of claim 1 wherein each of the voltage level detector circuit and the marginal voltage detector circuit are configured to compare a level of the voltage level to a level of a reference signal and are configured to generate the first and/or second binary voltage limitation signal based on the comparison, wherein the reference signal is provided by a bandgap.

9. The apparatus of claim 1 wherein the apparatus comprises a first apparatus of a plurality of apparatuses, and wherein a respective apparatus of the plurality of apparatuses is provided for each respective power supply of a plurality of power supplies.

10. A method of detecting an attack on, or degradation of, an electric circuit, the method comprising:
   determining whether voltage level of the electric circuit exceeds a selected maximum threshold value;
   determining whether voltage level of the electric circuit exceeds a marginal selected threshold value;
   generating a first binary voltage limitation signal if the voltage level exceeds the selected maximum threshold value;
   generating a second binary voltage limitation signal if the voltage level exceeds the selected marginal threshold value;
   monitoring the maximum and marginal binary voltage limitation signals over a predetermined time interval;
   detecting a possible attack on, or degradation of, the electric circuit based on the monitored maximum binary voltage limitation signal or the marginal voltage limitation signal, further comprising detecting a possible attack on, or degradation of, the electric circuit in the event that:
      (i) the first binary voltage limitation signal indicates that the voltage level exceeds the maximum selected threshold value; or
      (ii) the second binary voltage limitation signal indicates that the voltage level has exceeded the marginal selected threshold value more than a selected number of times in a selected period of time.

11. The method of claim 10 comprising determining that a possible attack has taken place in the event that the first binary voltage limitation signal indicates that the voltage level exceeds the maximum selected threshold value for more than a selected period of time.

12. The method of claim 10 wherein the maximum selected threshold value comprises a maximum selected threshold range and/or wherein the marginal selected threshold value comprises a marginal selected threshold range.

13. The method of claim 10 wherein the maximum selected threshold value comprises a lower maximum selected threshold value and a higher maximum selected threshold value, and the method comprising determining with a first comparator whether the voltage level of the electric circuit exceeds the lower maximum selected threshold value and determining with a second comparator whether the voltage level of the electric circuit exceeds the higher maximum selected threshold value.

14. The method of any of claim 10 wherein the marginal selected threshold value comprises a lower marginal selected threshold value and a higher marginal selected threshold value, and the method comprising determining with a first marginal comparator whether the voltage level of the electric circuit exceeds the lower marginal selected threshold value and determining with a second marginal comparator whether the voltage level of the electric circuit exceeds the higher marginal selected threshold value.

15. The method of claim 10 comprising:

counting the first and second binary voltage limitation signals with counting logic;

determining, with the counting logic, the time between receipt of the first and/or second binary voltage limitation signals; and determining that a possible attack or degradation has taken place in the event that the counting logic determines that the voltage level exceeds the marginal selected threshold value a plurality of times within a selected time interval.

16. The method of claim 10 wherein determining whether the voltage level of the electric circuit exceeds a selected maximum threshold value and/or a marginal selected threshold level comprises comparing a level of the voltage supply to a level of a reference signal and generating the first and/or second binary voltage limitation signal based on the comparison.

17. A computer readable non-transitory storage medium comprising a program for a computer configured to cause a processor to perform:

determining whether voltage level of an electric circuit exceeds a selected maximum threshold value;

determining whether voltage level of the electric circuit exceeds a marginal selected threshold value;

generating a first binary voltage limitation signal if the voltage level exceeds the selected maximum threshold value;

generating a second binary voltage limitation signal if the voltage level exceeds the selected marginal threshold value;

monitoring the maximum and marginal binary voltage limitation signals over a predetermined time interval;

detecting a possible attack on, or degradation of, the electric circuit based on the monitored maximum binary voltage limitation signal or the marginal voltage limitation signal, further comprising detecting a possible attack on, or degradation of, the electric circuit in the event that:

(i) the first binary voltage limitation signal indicates that the voltage level exceeds the maximum selected threshold value; or (ii) the second binary voltage limitation signal indicates that the voltage level has exceeded the marginal selected threshold value more than a selected number of times in a selected period of time.

* * * * *